United States Patent [19]

Mason et al.

[11] 4,163,066
[45] Jul. 31, 1979

[54] FREE-FLOWING, NON-CHARRING SOLID FAT USEFUL FOR POPPING POPCORN

[75] Inventors: Ron G. Mason, Arlington; Herbert L. Rice, Fort Worth, both of Tex.

[73] Assignee: Richard D. Emerick, Fort Worth, Tex.

[21] Appl. No.: 850,447

[22] Filed: Nov. 10, 1977

[51] Int. Cl.$^2$ .......................... A23D 5/00; A23L 1/18
[52] U.S. Cl. ...................................... 426/99; 426/307; 426/609; 426/618; 426/625
[58] Field of Search ................. 426/99, 307, 309, 609, 426/613, 625, 618

[56] References Cited

U.S. PATENT DOCUMENTS

| | | | |
|---|---|---|---|
| 2,222,560 | 11/1940 | Clickner | 426/99 |
| 2,604,407 | 7/1952 | Martin | 426/309 |
| 2,648,610 | 8/1953 | Martin | 426/625 X |
| 2,702,246 | 2/1955 | Kinsella | 426/625 X |
| 3,140,952 | 7/1964 | Cretors | 426/625 X |
| 3,261,692 | 7/1966 | Chang et al. | 426/307 X |
| 3,704,133 | 11/1972 | Kracauer | 426/625 X |
| 3,961,091 | 6/1976 | Caccavale et al. | 426/309 X |

*Primary Examiner*—Robert A. Yoncoskie
*Attorney, Agent, or Firm*—Wofford, Fails & Zobal

[57] ABSTRACT

A composition for popping corn and method of use, characterized by a hydrogenated edible vegetable oil comprised primarily of $C_{16}$-$C_{18}$ triglycerides with a melting point above 122° F., which has been liquefied to allow for the homogeneous inclusion of salt of particle size finer than 100 mesh, and coloring and flavoring additives, which is then chilled to a flaked or powdered free flowing solid. The composition and method accomplish the objectives of elimination of smoke, fume, and spill hazard, overloading of overhead venting systems with excessive oil accumulation in the popping operation, elimination of charring and formation of tars in the popping equipment, and providing a simpler method for conducting commercial popping operations.

10 Claims, No Drawings

FREE-FLOWING, NON-CHARRING SOLID FAT USEFUL FOR POPPING POPCORN

BACKGROUND OF THE INVENTION

1. Field of the Invention

This invention relates to the art of popping popcorn. More particularly, it relates to compositions facilitating the popping of the popcorn and cleaning of the equipment thereafter.

2. Description of the Prior Art

The most common sources of oil for popping popcorn are coconut oil or liquid vegetable oils which contain a high degree of unsaturation, e.g., corn oil, soybean oil, and certain partially hydrogenated edible oils like cottonseed. Coconut oil is preferred because it is easy to melt (melting point about 75° F.) and because it is mostly saturated and tends therefore not to cause the charring of popcorn equipment or tar formation at the high temperatures required to release the water from the corn kernels (pop the corn). The latter feature is particularly important in commercial popping operations in which large volumes of popcorn are popped. The use of coconut oil considerably reduces the tar formation and charring caused by polymerization of unsaturated compounds in higher molecular weight vegetable oils and thus allows the popping equipment to be cleaned more easily. A disadvantage to the use of coconut oil is its lower molecular weight and subsequently lower smoke point in comparison with the vegetable oils of higher molecular weight. The combination of lower smoke point and the increased tendency of this type of oil to be steam distilled in popping the corn contributes to an increased vapor density of coconut oil resulting in more fumes in the popping equipment atmosphere and a heavier load on the overhead venting system.

The higher molecular weight edible oils used for popping corn contain a much greater degree of unsaturation than coconut oil and are liquid at room temperature. If such oils are partially hydrogenated to produce products with a consistency like that of coconut oil (soft solid) and with comparable melting points (68°-95° F.), the oils still contain a large amount of unsaturation and will cause equipment charring. Such higher molecular weight oils have only a small tendency to cause smoke and fumes, and this is a desirable characteristic.

Trends in the state of the art in the popping of corn have been to make the total operation simpler, and to find ways to protect popcorn kernels from losing moisture. This has involved attempts to put together in a single package more than one of the ingredients. For instance, U.S. Pat. No. 2,604,407 teaches that it is possible to preserve moisture in popcorn kernels by packaging the kernels with the correct amount of liquid fat (vegetable oil) and solidifying the mixture at room temperature or under refrigeration in such manner that homogeneous parcels with the correct amounts of corn and oil may be obtained for individual use. U.S. Pat. No. 2,518,247 teaches the use of a total combined package of popcorn, oil (used as binder), salt, color, and flavoring. If the temperature of storage becomes high (95°-110° F.), the oil becomes less viscous and the salt separates. Unless this type of system is packaged in such a unit as to be used for individual servings, the concept of homogeneity is lost for multiple servings. This may be illustrated in two ways. First, U.S. Pat. No. 2,648,610 is cited on the label for a product available in grocery stores combining popcorn, popping oil, and flavoring, but not salt, as such a liquid system will not support a homogeneous distribution of salt. Naturally, flavoring and coloring additives are soluble in oil and will therefore be homogeneously distributed as far as individual servings are concerned. Second, a solution to the problem of homogeneity of ingredients is offered in U.S. Pat. No. 3,140,034, in which all necessary ingredients for preparing acceptable popcorn are placed in a unit disposable container with an expandable aluminum cover. The container is heated, the corn is popped and removed, and the unit is discarded. An examination of the contents of such a system reveals that an inhomogeneous mixture of ingredients exists to such an extent that would render it unsuitable for more than the one serving of popcorn for which the system is designed. U.S. Pat. No. 2,648,610 combines popcorn, oil, and flavorings and colorings, but no salt. In effect, most attempts to simplify the popcorn popping operation have essentially involved the multipackaging of popcorn and oil without consideration of the cleanliness of the operation, its application to commercial operations, and the practical combination of such inhomogeneous materials as popcorn oil and salt.

In a practical sense, the present day melting of solid popcorn oils as hereinbefore described, or the use of liquid oils, especially in commercial popping operations, tends to result in spills which are messy, hard to clean up, or hazardous. This is true even of popping operations carried out in single units as in the home.

SUMMARY OF THE INVENTION

With the preceding in mind, it thus becomes the object to create a system which is improved from the following viewpoints: (1) to provide a vehicle for the combining of certain of the ingredients required to produce acceptable popcorn in which a homogeneous distribution of the ingredients will allow a simplification of corn popping in commercial operations; (2) to lower smoke tendency of the popping operation subsequently lowering atmospheric fumes and unnecessary loading of overhead venting systems with oil; (3) to reduce and essentially eliminate the problem of charring and tar formation in commercial popcorn equipment caused by the use of unsaturated popping oils; (4) to provide a product that is easy to clean up in the event of spills in comparison with liquids, solids, or melted solids currently in use for the popping of corn.

In accordance with one aspect of this invention there is provided a composition for popping popcorn comprising free flowing solid particles of hydrogenated triglyceride having a melting point above about 122° F. and having smaller particles of salt substantially homogeneously distributed thoughout. Preferably, the composition also includes coloring and flavoring.

In another aspect of this invention there is provided a method of popping the popcorn including the steps of preparing and using the foregoing composition.

DESCRIPTION OF PREFERRED EMBODIMENTS

We have found that hydrogenated edible vegetable oils melting above 120° F. are suitable vehicles for providing the improvements described in the objects of our invention if they meet certain requirements. If the hydrogenated oils have a low iodine value (<6), they would be too high melting to use in the same manner as coconut oil, or partially hydrogenated higher molecular weight oils which are stored in cans in bulk form. That is, they would be too difficult to melt before use as is done with bulk forms of coconut oil and partially hydrogenated vegetable oils. The essentially fully hydrogenated high melting vegetable oils are hard solids and could not be readily removed from bulk storage containers by scooping or dipping. Because of this inherent hardness, it is thus possible that molten forms of the hydrogenated vegetable oils could be solidified by cooling and subdividing the hard solid particles to flake or powdered form which would then flow freely at room temperature without the need to melt such products or create messy oils.

The hardness of the cooled, subdivided particles of high melting hydrogenated vegetable oils allow for the supporting of a homogeneous distribution of inorganic material of substantially different density, such as salt, without the danger of segregation of mixed product due to vehicle attrition in handling, storing, or pouring. Because of the higher molecular weight of the hydrogenated vegetable oils, and the high degree of saturation, such materials will be essentially non-smoking, will greatly reduce tar and char formation, and will not cause problems associated with melted oils and spills from an "ease of cleaning" standpoint.

In essence, fully hydrogenated edible vegetable oils prepared from sources such as palm oil, soybean oil, peanut oil, cottonseed oil, corn oil, in which are contained predominantly $C_{16}$–$C_{18}$ triglycerides, become relatively hard solids below 122° F. If these solids are prepared in a divided form such as flaked or powdered, they will pour easily from a container at room temperature or even under normal conditions of heated storage (e.g. 120°–130° F.). Such solids will melt rapidly under the heating conditions used in popping corn. Because of the higher molecular weight, these solids tend not to smoke and cause fume problems and oil build-up in overhead exhaust systems. Because these solids are essentially fully saturated, they may be utilized in popping equipment without fear of char and tar build-up experienced in use of unsaturated oils. In case of spills, these solids eliminate the hazards of accidents from slipping on spilled liquid oil, and are easily swept aside or readily collected for disposal and present no messy stains as far as a clean-up operation might be concerned. In addition were these solids to contain salt in such proportion as to be present finally on acceptable popcorn, the salt would remain homogeneously bound within the hard, free flowing flake or powder particle and not segregate in any container in which, perhaps, a large quantity of the solid were to be placed.

More particularly, it has been found that if an edible vegetable oil like palm oil or soybean oil is hydrogenated to such an extent that it's melting point becomes greater than 122° F., and if the liquid hydrogenated oil is treated with salt, coloring agents, and flavoring agents, and is then processed by cooling or chilling to a solid product at ordinary temperatures by means of flaking or a spray chilling operation, a free flowing solid product will result which may be added separately to popcorn kernels for commercial operations which is homogeneous, essentially smokeless, presents no clean-up difficulties, does not char equipment, and requires no premelting.

The so-called "solid" fats of this invention may be formed from many naturally occurring edible vegetable oils by the process of hydrogenation. It is inherent in the invention to gain a solid product having a sufficiently high melting point to withstand storage at temperatures of at least 120° F. which is typical of normal conditions of hot warehouse storage. Coconut oil has a natural degree of unsaturation such that an iodine value would measure about 6. If coconut oil were hydrogenated to reduce the iodine value to the order of 1 or less, the melting point could be raised from about 75° F. to about 95° F. This is not sufficient to meet the requirements of this invention. However, it should be pointed out that the natural unsaturation in coconut oil giving an iodine value of 6 is low enough to allow popping of popcorn without undue char and tar formation. Now, liquid edible vegetable oils containing predominantly the triglycerides of chain length $C_{16}$–$C_{18}$ in the fatty acid moieties are liquids at temperatures of 75° F. and will positively char and foul popcorn equipment. If such materials are essentially fully hydrogenated to low iodine values, say 6 or less, the melting points of such products are raised to over 122° F. Hydrogenated palm oil which has a predominance of $C_{16}$ fatty acid triglycerides has a melting point of 135° F. Hydrogenated soybean oil which has a predominance of $C_{18}$ fatty acid triglycerides has a melting point of about 153° F. So, a hydrogenated vegetable oil prepared to a melting point of over 120° F. should be satisfactory for the purpose of this invention provided the iodine value is of the order of 6 or less. In essence, this means that all of the partially hydrogenated oils (or fats) with melting temperatures in the range of 70°–95° F. are unsuitable for this invention. The iodine value of such products is in the range from about 45 to about 90. Melting points are not high enough to provide the temperature stability in storage. Hence, the fatty acid compositions of our invention require that essentially full hydrogenation of any vegetable oil with predominantly $C_{16}$–$C_{18}$ fatty acid moieties will yield a melting temperature of at least 120° F. and an iodine value of less than 6. In order to maintain the non-char, non-tar objectives of our invention, it is recognized that the melting point of fully hydrogenated $C_{16}$–$C_{18}$ vegetable oils may be lowered to values approaching 120° F. by the blending with coconut oil or hydrogenated coconut oil without detracting from the non-char, non-tar characteristic of our invention. Generally such blends are too soft to accomplish the other objectives of our invention. What is required is essentially a fatty triglyceride known as an edible vegetable oil which contains predominately $C_{16}$–$C_{18}$ carbon chains and which is fully hydrogenated to iodine value 6 or less and melting point 120° F. or higher, and blends thereof, which have a hard room temperature solid consistency to serve as smokeless, non-charring vehicles for the support of salt, coloring, and flavorings in a novel free flowing fat product suitable for popping popcorn, especially in commercial operations.

The salt that is employed in this invention may comprise any of the salts employed for taste, or seasoning; including the salt substitutes for patients requiring salt-free diets. The salts are water soluble and inorganic so resist homogeneous dispersion in a fat. The salts include potassium chloride and the like, but usually is sodium chloride.

In the process for preparing a homogeneous solid free flowing product to be added to popcorn kernels, it has been found that food grade salt of the order of 100 mesh or smaller is required because this size of salt particle will remain suspended in the melted hydrogenated triglyceride long enough to allow homogeneous distribution of the salt while the liquid triglyceride is being converted to a flaked or powdered product in a processing operation. The preferred salt particle size is about 200 mesh because this suspends more readily and for a longer time in liquefied oil and is available as a commercial food product. Salt particle size of −325 mesh would also suspend satisfactorily in oil and would be suitable for this invention. Such −325 mesh salt is not available as food grade material because of the excessive amount of anticaking agent required to keep such salt free flowing in storage. However, coarse food grade salt could be ground to −325 mesh size and fed directly to the molten triglyceride to be used to make the final solid product of this invention. Once the solid, free flowing product has been obtained, the individual particle has enough strength to avoid the elimination of entrained salt, or the segregation of product which is not of homogeneous nature.

A normal flaking operation involves the feeding of a molten material to a rotating cylindrical metal roll which may or may not require a cooling fluid. The molten fluid is solidified upon contact with the chilled or cooled rotating cylinder and has a tendency to form a cracked film upon the cylinder. A knife type blade scrapes the cracked film of product from the roll and conveys it to a packaging operation. Solid free flowing particles produced from hydrogenated triglycerides such as are the substance of this invention are generally small, say of the order of 0.2 inches, mean particle diameter. By varying the flaking conditions it is possible to increase the size of the flakes or free flowing solid particles. This is not important to the scope of our invention because such solid free flowing fat products may also be produced in a tower equipped to chill a subdivided molten stream of liquid fat sprayed through nozzles. In fact, were one inclined, it would be possible to agglomerate or granulate large solid fat particles such as chunks, or bars of product, using extruding equipment, without suffering the disadvantages of the prior art. Normally, the product of our invention is produced in flake form of relatively small particle size where the mean particle size is about 0.2 inches but is generally not larger than 1 inch.

In order to make a complete package of ingredients, it is possible to add to the melted hydrogenated edible vegetable oil both coloring and flavoring additives, in addition to the salt. As is known in the art, flavorings may comprise the ingredients described as isobutyric acid, butyric acid, valeric acid, butyric acid esters, lactic acid, butter acids, butter esters, lipolyzed butterfat, lauric acid oils, diacetyl, and so on. Color additives may be used from the group consisting of betacarotene, Citrus Red #2, Orange B, FD&C Reds 3, 40 FD&C Yellow 5, 6, Tumeric, carmine, riboflavin, ferric ammonium citrate, corn endosperm oil, and so on.

In this invention the following concentrations and proportions can be employed. As will be appreciated, some variations can be made depending on the taste and health characteristics of the ultimate consumer.

The hydrogenated triglyceride, or vegetable fat is admixed with the salt in a concentration within the range of 50-95 percent by weight. The optimum concentration has been found to be about 72 percent by weight.

The salt is admixed in a concentration within the range of 5-50 percent by weight of the salt and the triglyceride. The optimum concentration has been found to be about 28 percent by weight.

Preferably, there is also included 0.01-1.0 percent by weight of coloring (based on the total weight of the composition). The optimum concentration has been found to be about 0.13 percent by weight.

Preferably, also, there is included 0.05-2.0 percent by weight of flavoring. The optimum concentration has been found to be about 0.18 percent by weight.

The composition described herein is admixed in a first predetermined quantity with a second predetermined quantity of popcorn before popping and thereafter heated sufficiently to pop the popcorn. The first predetermined quantity of the composition is in a proportion within the range of 10-30 percent by weight. The optimum proportion of the composition is about 15 percent by weight. The second predetermined quantity of popcorn is in a proportion within the range of 70-90 percent by weight. The optimum proportion of the popcorn is about 85 percent by weight.

As will become evident in the following examples, what we have discovered is a method for preparing a "solid" free flowing popcorn oil (fat) comprising the oil, salt, color and flavor additives which is of such a homogeneous nature as to permit its use in simplification of commercial popcorn popping operations to the extent that the solid "oil" may be added measure after measure to a measured amount of popcorn because of it's homogeneity, it's tendency to remain so at high temperature storage conditions, the other improvements being reduced char and tar in the popping equipment, less vaporized fumes in the popping equipment atmosphere, less oil build-up in the overhead venting systems, and essentially no waste disposal problem, or grease contamination problem in the event of a spill.

It now becomes evident that the solid free flowing product of this invention may easily be combined in a moisture proof package with popcorn itself to provide the complete package for the individual serving as in the description of the prior art. Hence our invention should not be considered to be limited strictly to the commercial popcorn popping industry. Nor should we be limited by the definition of hydrogenated vegetable oils as solids if they meet the melting point criterion of 120° F. and iodine value of 6 maximum.

EXAMPLES

The following examples will serve to illustrate the novelty of our invention, compared with two commercial standards.

Standard 1

A standard gas-fired commercial popping unit was charged with 40 oz. of popcorn kernels, 141 gms of melted coconut oil (about ¾ cup), and 2 oz. of salt containing color and flavor additives. Corn was popped with this charge 1000 times emptying the popped corn between batches but not cleaning the equipment. This is a standard operation. The popcorn produced was acceptable as far as taste, odor, and appearance was concerned. The operation produced a good deal of smoke and fumes in the atmosphere even with an overhead venting system but the equipment showed minimal signs of tar and char build-up.

Standard 2

The same experiment was conducted as in Standard 1 except the oil used was melted, partially hydrogenated, soybean oil (melting point 90° F.). After a 200 batch popping operation there was considerable char and tar build-up in the equipment. However, a minimum of smoke was observed during the operation.

EXAMPLE 1

In this example attempts were made to prepare free flowing solid fats which embody the objectives of our invention. The following products were prepared by melting a fat in a container with stirring including other additives as indicated in the table. Stirring was stopped and the mixture poured over an aluminum sheet maintained at room temperature or below in order to solidify. After cooling, the solid products were removed from the sheet in the form of small flakes.

| Materials | Compound (Product) | | | | |
|---|---|---|---|---|---|
| | 1-8-1 | 1-8-4 | 1-6-3 | 1-8-3 | 1-9-2 |
| Hydrogenated Palm Oil, M.P. 135° F. | 141g | | 141g | | |
| Hydrogenated Soybean Oil, M.P. 153° F. | | 141g | | 141g | 141g |
| Salt, 50-75 mesh | 56g | | | | |
| Salt, 200 mesh | | 56g | 56g | | 56g |
| Salt, 325 mesh | | | | 56g | |
| Coloring | | | | | 0.09g |
| Flavoring | | | | | 0.37g | g=grams

Product 1-8-1 separated salt during cooling. The product was free flowing but showed definite signs of salt separation and segregation. The remaining products in the table were homogeneous free flowing materials showing no separation of salt even when individual flake particles were further subdivided. This also illustrates the effect of salt fineness in the preparation of a homogeneous product. Because of the melting point of the fats used, all products from the table were stable to melting at 120° F. All products shown in the above table were considered to be satisfactory except 1-8-1.

EXAMPLE 2

The products 1-8-4, 1-6-3, 1-8-3, and 1-9-2 from the table of Example 1 were added in successive popping operations to 40 oz. of popcorn kernels per batch as in Standard 1. Very little fumes and smoke were produced. The equipment was found to be in the same clean state as left by the coconut oil of Standard 1.

EXAMPLE 3

As in Example 1, a free flowing fat product was produced by melting fully hydrogenated soybean oil (melting point 153° F.), adding 200 mesh food grade salt, coloring, and flavoring, then solidifying and flaking said mix to obtain product 1-12-2. This product was poured onto the floor and purposely walked over. The product was easily swept up into a dust pan with no grease stains remaining on the floor. This illustrates how easily the product may be cleaned up.

Having thus described this invention, it will be understood that such description has been given by way of illustration and example and not by way of limitation; it being evident that various changes and modifications may be made in this invention without departing from the spirit and scope thereof.

What is claimed is:

1. A composition for popping popcorn comprising a particulate, free flowing solid hydrogenated edible vegetable oil of a mean particle size of about 0.2 inches but not larger than 1 inch, consisting essentially of triglycerides containing predominantly 16-18 carbon atoms, inclusive, and hydrogenated sufficiently to have a melting point above about 122° F., having substantially homogeneously dispersed throughout a water soluble, edible, inorganic salt of particle sizes sufficiently small to remain in said substantially homogeneous suspension in said molten vegetable oil during solidification thereof; said salt being of no larger than about −100 mesh particle size; said hydrogenated edible vegetable oil being in a concentration within the range of 50-95 percent by weight and said salt being in a concentration within the range of 5-50 percent by weight.

2. The composition of claim 1 wherein said hydrogenated edible vegetable oil is in a concentration of about 72 weight percent and said salt is in a concentration of about 28 weight percent.

3. The composition of claim 2 further including substantially homogeneously admixed throughout 0.01-1.0 percent by weight of coloring and 0.05-2.0 percent by weight of flavoring.

4. The composition of claim 3 wherein said coloring and said flavoring are in respective concentrations of about 0.13 and 0.18 weight percent.

5. The composition of claim 1 further including popcorn; said popcorn being in a range of 70-90 percent by weight and the remainder comprising said particulate, free flowing solid hydrogenated edible vegetable oil containing said salt.

6. The composition of claim 5 wherein said proportions of said popcorn and said remainder are, respectively, about 85 and 15 percent by weight.

7. A method of popping popcorn in popping equipment comprising the steps of:
   a. hydrogenating an edible vegetable oil consisting essentially of edible triglycerides containing predominately 16-18 carbon atoms, inclusive, to have a melting point above 122° F.;
   b. melting said hydrogenated edible vegetable oil;
   c. while said hydrogenated edible vegetable oil is molten, homogeneously admixing a water soluble, edible, inorganic salt of particle sizes small enough to remain in substantially homogeneous admixture during solidification of said mixture of hydrogenated vegetable oil and salt; said particle sizes being at least as small as −100 mesh; said hydrogenated edible vegetable oil and salt being admixed in respective concentrations within the respective ranges of 50-95 and 5-50 percents by weight;
   d. solidifying said substantially homogeneous admixture of said hydrogenated edible vegetable oil and said salt;
   e. subdividing said solidified hydrogenated vegetable oil and salt into free flowing solid particles of a mean particle size of about 0.2 inches but less than 1 inch;
   f. admixing a first quantity of said free flowing solid particles of said hydrogenated edible vegetable oil and said salt with a second quantity of the popcorn;

said first and second quantities of said free flowing particles of said hydrogenated edible vegetable oil and salt and said popcorn being within respective proportions of 10-30 and 70-90 percents by weight; and g. popping said popcorn with said fat and salt with essentially no tar and char build-up, practically no smoke and fumes, and no excessive oil accumulation.

8. The method of claim 7 wherein 0.01-1.0 percent by weight coloring and 0.05-2.0 percent by weight flavoring is admixed with said molten hydrogenerated edible vegetable oil and salt in step c. so as to produce popcorn of pleasing color and flavor.

9. The composition of claim 1 wherein said particles of salt are in the size range of −200 mesh to −325 mesh.

10. The method of claim 7 wherein said particles of salt are in the size range of −200 mesh to −325 mesh.

* * * * *